(12) United States Patent  
Xu

(10) Patent No.: US 11,788,678 B2
(45) Date of Patent: Oct. 17, 2023

(54) BRACKET

(71) Applicants: Jiaxiang Xu, Zhejiang (CN); Bo Liu, Zhejiang (CN)

(72) Inventor: Jiaxiang Xu, Zhejiang (CN)

(73) Assignees: Jiaxiang Xu, Hangzhou (CN); Bo Liu, Hangzhou (CN)

( * ) Notice: Subject to any disclaimer, the term of this patent is extended or adjusted under 35 U.S.C. 154(b) by 177 days.

(21) Appl. No.: 17/537,603

(22) Filed: Nov. 30, 2021

(65) Prior Publication Data

US 2023/0136587 A1 May 4, 2023

Related U.S. Application Data

(63) Continuation of application No. PCT/CN2021/127634, filed on Oct. 29, 2021.

(51) Int. Cl.
*F16M 13/02* (2006.01)
*F16B 45/00* (2006.01)

(52) U.S. Cl.
CPC ............. *F16M 13/02* (2013.01); *F16B 45/00* (2013.01)

(58) Field of Classification Search
CPC ................................ F16M 13/02; F16B 45/00
USPC ......................................... 248/304, 215, 339
See application file for complete search history.

(56) References Cited

U.S. PATENT DOCUMENTS

| | | | | |
|---|---|---|---|---|
| 6,637,707 | B1 * | 10/2003 | Gates | A47F 5/08 248/222.12 |
| 8,251,342 | B1 * | 8/2012 | Weiner | A63C 17/0006 248/692 |
| 11,690,468 | B1 * | 7/2023 | Xu | A47H 1/142 248/251 |
| 2010/0123060 | A1 * | 5/2010 | Robichaud | A47G 25/0635 248/217.4 |
| 2010/0162534 | A1 * | 7/2010 | Kato | F16B 19/1081 24/292 |
| 2014/0027582 | A1 * | 1/2014 | Newman | H02G 3/30 248/65 |

FOREIGN PATENT DOCUMENTS

| | | |
|---|---|---|
| CN | 200970108 Y | 11/2007 |
| CN | 206659637 U | 11/2017 |
| CN | 209031810 U | 6/2019 |
| CN | 209315501 U | 8/2019 |
| CN | 209415063 U | 9/2019 |
| CN | 212603010 U | 2/2021 |
| CN | 213018478 U | 4/2021 |
| JP | 2007152009 A | 6/2007 |
| JP | 4836566 B2 | 12/2011 |
| RU | 185775 U1 | 12/2018 |

* cited by examiner

*Primary Examiner* — Todd M Epps

(57) ABSTRACT

A bracket includes a base for external connection and a hooking part connected with the base, a bending portion of the hooking part forms a groove, a groove wall connected the groove with the base is provided with a mounting hole, the mounting hole is provided with a damping element, and a damping portion of the damping element is located in the groove.

10 Claims, 8 Drawing Sheets

BRACKET

CROSS-REFERENCE TO RELATED APPLICATION

This application is a continuation of international PCT application serial no. PCT/CN2021/127634, filed on Oct. 29, 2021. The entirety of the above-mentioned patent application is hereby incorporated by reference herein and made a part of this specification.

TECHNICAL FIELD

The present application relates to the technical field of a mounting rack, and particularly to a bracket.

BACKGROUND ART

A bracket is often mounted on a wall or ceiling, which is a basic component for supporting objects. When in use, it is generally matched with rod components, and the rod components are connected to adjacent brackets, so that the rod is hung in the air. This kind of rod is generally used for items such as hanging curtains, washing supplies, projection curtains.

There are generally two connection ways between the bracket and the rod component.

The first one is locking fixing. However, the rod components are often more easily damaged than brackets, for example, bending, deforming or breaking. For example, in the case of hanging the curtain, the curtain often needs to be cleaned and changed regularly, and thus such bracket is not convenient for use since it is installed in the wall or ceiling and cannot be detached conveniently.

The second one is a bracket provided with a groove on the surface thereof, in which the two ends of the rod are provided Although this way can achieve the purpose of replacing the rod components, the rod components tend to loosen relative to the grooves, having a poor stability.

SUMMARY

In order to enable a rod component to be mounted on/detached from a bracket while ensuring sufficient stability, the present application provides a bracket.

A bracket provided in the present application adopts the following technical solution:

a bracket including a base for external connection and a hooking part connected with the base, in which a bending portion of the hooking part forms a groove, a groove wall connected the groove with the base is provided with a mounting hole, the mounting hole is provided with a damping element, and a damping portion of the damping element is located in the groove.

In the above technical solution, the base can be externally connected to the wall or ceiling, and the damping element can be selected depending on the specification of the rod components. The damping element can be movably installed into the mounting hole or fixed through the mounting hole in advance. During the mounting process, taking an upward opening of the groove as an example, after the rod component is pressed into the groove from top to bottom, the damping element cannot move up and down due to the limitation of the mounting hole, thus the damping element will stop the rod component from moving up by damping. In this way, disassembling can be realized only by applying a force big enough to the rod component. This achieves the effect that the rod component can be mounted on or detached from the bracket, while ensuring sufficient stability after mounting.

Optionally, the mounting hole penetrates through the surface of the hooking part. The damping element includes a tailstock and a damping head fixedly connected with each other. The tailstock penetrates through the mounting hole, and the tailstock is provided with an anti-detachment structure to prevent the tailstock from falling off the mounting hole.

In the above technical solution, detachable mounting of the damping element can be realized. The damping element can be replaced according to the specification of the rod component, no matter whether the anti-detachment structure can be detached directly or destructively.

Optionally, the anti-detachment structure includes at least one elastic inclining block fixed at a side wall of the tailstock, in which a surface of the inclining block away from the damping head is an inclined guiding surface. When the tailstock is mounted in the mounting hole, the inclined guiding surface contacts the hole wall of mounting hole earlier than other surfaces of the inclining block.

In the above technical solution, the tailstock can be directly inserted in the mounting hole. During this process, the inclined guiding surface will provide a guidance and be deformed. After the tailstock is in place, the deformation will be restored, and the inclining block lacking guidance will prevent the tailstock from disengagement.

Optionally, a surface of the inclining block near the damping head is a stopping surface, and an acute angle between the stopping surface and a side wall of the tailstock exceeds an acute angle between the inclined guiding surface and the side wall of the tailstock by at least 20°.

In the above technical solution, firstly, an angle difference between the stopping surface and the inclined guiding surface represents a degree of easiness for deformation by pressing, that is, easy to mount but difficult to detach, so that the stability after mounting can be ensured. Secondly, the angel between the stopping surface and the tailstock is an acute angle. On the one hand, the tailstock can be pulled out upon the applying of a force big enough; and, on the other hand, during inserting, the stopping surface will press the damping head against the inner wall of the groove during the restoring of the inclined block, so as to improve the overall stability of the damping element.

Optionally, the surfaces of the damping head close to and away from the tailstock are arc surfaces, which bulge to the side away from the tailstock. An elastic cushion block is fixed at one side of the damping head close to the tailstock, and abuts against a groove wall of the groove, and at least one of two arc-shaped ends of the damping head abuts against the groove wall of the groove.

In the above technical solution, the elastic cushion block and the damping head can adaptively achieve abutting balance with the inner wall pile of the groove. On the one hand, it can achieve a sufficient stability and reduce the shaking of the damping element, and, on the other hand, when the rod components are pressed in, it can improve the amount of elastic deformation of the damping head and improve the damping effect.

Optionally, the surfaces of the damping head close to and away from the tailstock are multi-segment arc surfaces, and all of the arc surfaces of the damping head bulge to a side away from the tailstock. An arc surface of the damping head can be divided into a primary arc portion and a secondary arc portion. A connection portion between the groove wall of the groove and the base assumes an arc surface. One end of the primary arc portion abuts against the side wall of the groove, and the end of the primary arc portion connected with the secondary part abuts against the arc surface of the groove wall of the groove connected with the base. All the ends of the secondary arc portion abut against the arc surface connected between the groove wall of the groove and the base body. A side wall of the groove away from the base is provided with a convex portion, and the convex portion faces a connecting portion of the multi-segment arc surfaces of the damping head.

In the above technical solution, when the rod component is pressed against the surface of the damping head, an end of the primary arc portion connected with the primary arc portion and the secondary arc portion will be displaced and deformed outward under the guidance of the arc transition portion between the groove wall of the groove and the base, so as to provide a better avoidance for installing the rod component. The abutting connection of the other end of the secondary arc portion provides elastic structural support to avoid excessive deformation. After the rod component is installed into the groove, if it is forced to fall off, the portion of the primary arc portion towards the bottom of the groove will be pressed towards the opening of the groove, so that the middle portion of the primary arc portion toward the groove relative to the mounting hole, and the rod component will be easily stopped by the damping head. Hence, a simple-to-install and difficult-to-separate structure for a rod can be formed, providing the rod component with convenient mounting and higher stability. In addition, the convex portion serves an auxiliary function since the presence thereof will force the rod component to squeeze both the primary arc portion and the secondary part at the same time when being detached.

Optionally, the two opposite side walls of the tailstock are respectively provided with a limiting column. The mounting hole includes a main hole portion for the tailstock to pass through and a branch hole portion for the limiting column to pass through, and the number of the secondary holes is same as that of the limiting columns.

In the above technical solution, a limitation can be realized by rotation after the tailstock and the limiting column pass through the mounting hole. The specific rotation degree can be set according to the position of the limiting column relative to the tailstock.

Optionally, the mounting hole is a rectangular hole, a long side of the rectangle of the mounting hole is in the same direction as that of an axis of the hooking part. The projection of the tailstock along the long direction is of polygon, the polygon has an even number of sides. The number of sides of polygon is at least six, and the tailstock is made of elastic material. When the tailstock is in a final assembled state of the damping element and the hooking part, the two opposite faces of the tailstock are fitted with the two opposite and nearest hole walls of the mounting hole.

In the above technical solution, because the hooking part is an arc structure as a whole, in the case of an upward opening of the groove, when the length of the limiting column is in a horizontal direction, a portion of the limiting column abutting against an outer surface of the hooking part can be regarded as a straight line, and when the length of the limiting column is in an upward direction, a portion of the limiting column abutting against the outer surface of the hooking part can be regarded as a curve. Therefore, after the tailstock and the limiting column are inserted from the mounting hole, the rotation of the tailstock changes the orientation of the limiting column rotates from a horizontal direction to a vertical direction. In this process, the tailstock will also be further tightened so that the damping head can closely fit with the inner wall of the groove. In addition, in the process of rotation, since the tailstock is polygonal and the surface thereof fits with the hole wall of the mounting hole, the tailstock is rotated mainly depending on the elastic deformation of the tailstock. After the rotation is completed, the tailstock will not be easy to deflect due to the limitation provided by its shape, so as to ensure a structural stability during use.

Optionally, the tailstock is provided with a sliding slot on other opposite surfaces other than that provided with the limit column. The opening width of the sliding slot on the surface of the tailstock is less than the width of the inner cavity of the sliding slot. A side of the sliding slot close to the damping element is provided with an inlet slot, and the sliding slot is slidably connected with a filling block which can be used to fill the gap between the tailstock and the mounting hole. A glue filling slot laterally penetrating through the tailstock along the tailstock is recessed between the sliding slot and the inlet slot.

In the above technical solution, after the tailstock is rotatably installed in place, the filling block can be inserted through the inlet slot, then move along the sliding slot and fill the gap between the tailstock and the mounting hole. Therefore, the tailstock cannot rotate, and the tailstock cannot move in the direction away from the mounting hole due to the restriction of the limiting column. After the filling block is installed, a solidifiable glue can be injected into the glue filling slot from the side of the tailstock. After the solidifiable glue solidifies, since the glue filling slot is laterally positioned on the sliding path of the sliding block, it can play a good limiting role with sufficient strength. When the damping element is desired to be detached, a stick or needle smaller than the glue filling slot or the glue filling slot can be used to eject out the solidifiable glue.

Optionally, the shape of the mounting hole is an oval hole. An oval long axis of the mounting hole is in the same direction as that of an axis of the hooking part. The tailstock is an oval cylinder, the oval long axis of the tailstock is shorter than the oval long axis of the mounting hole, and the tailstock is elastic. The long axis length of the tailstock is sufficient to be reduced to be consistent with the short axis length of the mounting hole within the elastic deformation range. The limiting column is fixed in the area where the short axis of the tailstock is located.

In the above technical solution, for installation, firstly, the oval short edge of the tailstock is moved corresponding to the oval short edge of the mounting hole until the limiting column touches the inner wall of the groove. Then the tailstock is rotated to elastically deform the tailstock, and the limiting column falls into a position where it can pass through the mounting hole. Then, the limiting column is inserted into the mounting hole along with the tailstock and passes through the mounting hole. In this state, the tailstock has the elastic force of reverse rotation for restoring, and can be released or manually reversely rotated. In this way, the limiting column will abut against a surface of the hooking part far away from the damping head, playing the role of limiting and preventing detachment.

In summary, the present application includes at least one of the following beneficial technical effects.
1. The damping element can be selected depending on the specification of the rod components. The damping element can be movably installed into the mounting hole or fixed through the mounting hole in advance. During the mounting process, taking an upward opening of the groove as an example, after the rod component is pressed into the groove from top to bottom, the damping element cannot move up and down due to the limitation of the mounting hole, thus the damping element will stop the rod component from moving up by damping. In this way, disassembling can be realized only by applying a force big enough to the rod component. This realizes the effect that the rod component can be mounted on or detached from the bracket, while ensuring sufficient stability after mounting.

2. On the one hand, the tailstock can be pulled out upon the applying of a force big enough; and, on the other hand, during inserting, the stopping surface will press the damping head against the inner wall of the groove during the restoring of the inclined block, so as to improve the overall stability of the damping element.

3. When the rod component is pressed against the surface of the damping head, an end of the primary arc portion connected with the secondary arc portion will be displaced and deformed outward under the guidance of the arc transition portion between the groove wall of the groove and the base, so as to provide better avoidance for installing the rod component. Abutting connection of the other end of the secondary arc portion provides elastic structural support to avoid excessive deformation. After the rod component is installed into the groove, if it is forced to fall off, the portion of the primary arc portion towards the bottom of the groove will be pressed towards the opening of the groove, so that the middle portion of the primary arc portion is pulled toward the groove relative to the mounting hole to, and the rod component will be easily stopped by the damping head. Hence, a simple-to-install and difficult-to-separate structure for a rod can be formed, providing the rod component with convenient mounting and higher stability.

DETAILED DESCRIPTION

The present application is further described in detail below in combination with the FIGS. 1-8.

The present application discloses a bracket.

Embodiment 1

Figure 1:
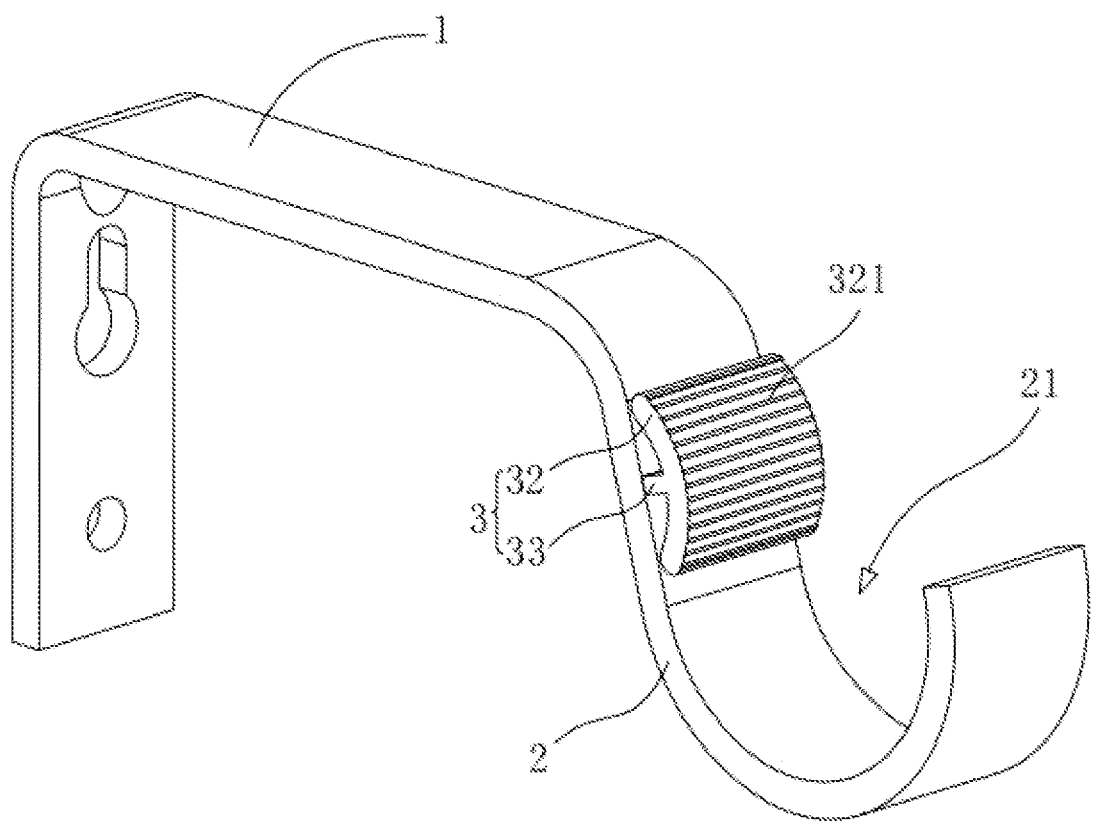
FIG. 1 is an overall structural diagram of a bracket of Embodiment 1.
Figure 2:
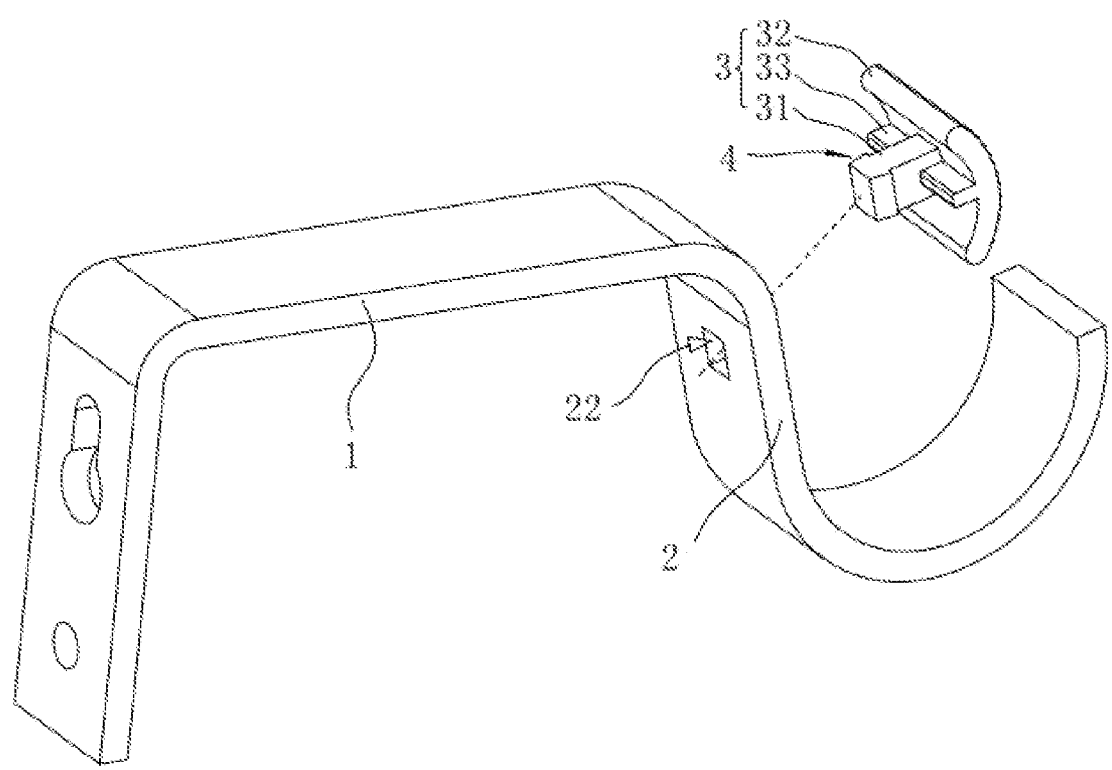
FIG. 2 is an explosion diagram of a bracket of Embodiment 1.

Referring to FIG. 1 and FIG. 2, a bracket includes a base 1 and a hooking part 2, and the base 1 is integrated with the hooking part 2. In this embodiment, the base 1 and the hooking part 2 are made of mental material. In this embodiment, the base 1 is L-shaped, and one of the L-shaped surfaces is provided with one or more holes for connecting with a wall or ceiling through a screw bolt. In other embodiments, it also can be of other shapes adapted to a space corresponding to the wall or ceiling, such as V-shape. In this embodiment, the hooking part 2 is U-shaped, and the L-shaped end of the base 1 without a hole is connected with the U-shaped end of the hooking part 2. In other embodiments, the hooking part 2 can be of other shapes which can clamp a rod, such as C-shape, V-shape or the like.

A curved portion of the hooking part 2 forms a groove 21, and the groove wall of the groove 21 connected with the base 1 is provided with a mounting hole 22 which penetrates through the U-shaped surface of the hooking part 2.

The mounting hole 22 is provided with a damping element 3 which includes a tailstock 31 and a damping head 32. The tailstock 31 penetrates through the mounting hole 22, and the damping head 32 enters the groove 21. In this embodiment, the tailstock 31 and the damping head 32 are integrally injection molded, and the materials of the tailstock 31 and the damping head 32 can be the same or different. If different, two-color injection molding is adopted, and the material damping factor of the damping head 32 is greater than that of the tailstock 31. This embodiment takes the same material as an example.

Surfaces of the damping head 32 close to and away from the tailstock 31 are arc surfaces, and all of the arc surfaces of the damping head 32 bulge toward a side away from the tailstock 31. A damping pattern 321 is provided on a surface of the damping head 32 away from the tailstock 31. An elastic cushion block 33 is fixed on one side of the damping head 32 close to the tailstock 31, the elastic cushion block 33 abuts against a groove wall of the groove 21, and at least one of the two arc-shaped ends of the damping head 32 abuts against the groove wall of the groove 21. After installing damping portion 3, both ends of the damping head 32 abut against the groove wall of the groove 21, so that only elastic deformation will occur during the installation of the rod component, avoiding jumping.

Figure 3:
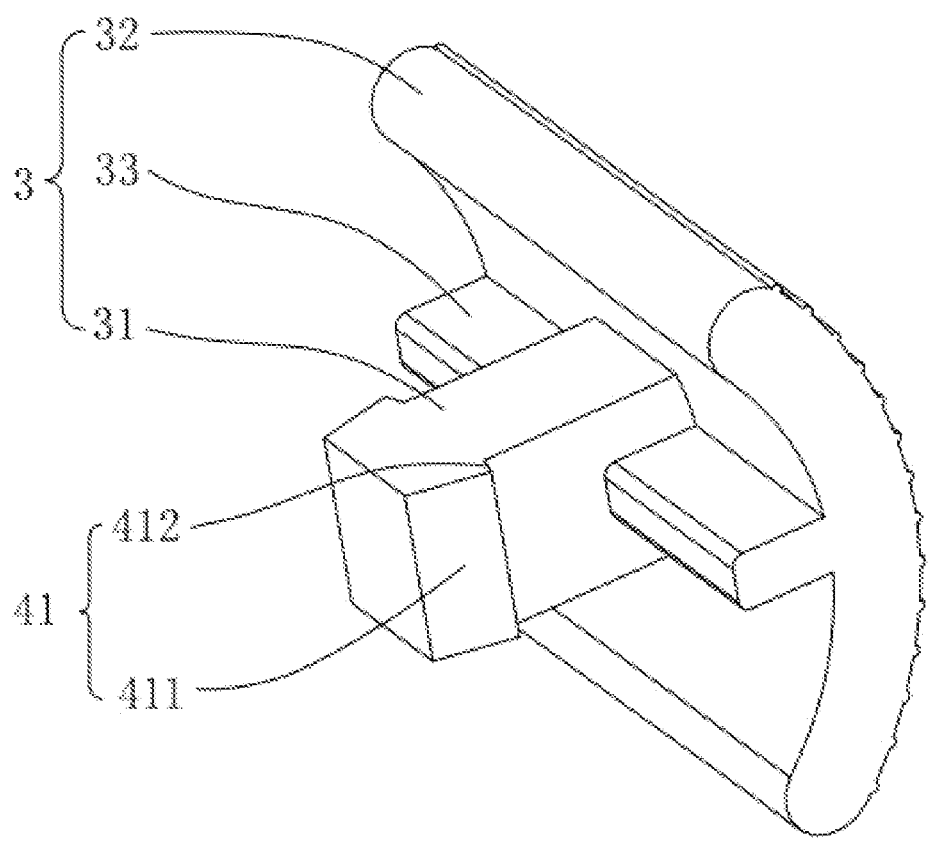
FIG. 3 is an overall structural diagram of a damping element of Embodiment 1.

Referring to FIG. 2 and FIG. 3, the tailstock 31 is provided with an anti-detachment structure 4 to prevent the tailstock 31 from separating from the mounting hole 22. In this embodiment, the anti-detachment structure 4 includes two inclining blocks 41 fixed at opposite side walls of the tailstock 31, and the inclining blocks 41 are elastic. A surface of the inclining block 41 away from the damping head 32 is an inclined guiding surface 411. When the tailstock 31 is mounted in the mounting hole 22, the inclined guiding surface 411 contacts the hole wall of the mounting hole 22 earlier than other surfaces of the inclining block 41 to provide direction guiding, elastically deforms, penetrates through the mounting hole 22, and restore its shape. With this, the surface of the inclining block 41 close to the damping head 32 abuts against the surface of the hooking part 2 to prevent the tailstock 31 from detachment. A surface of the inclining block 41 near the damping head 32 is a stopping surface 412, and the acute angle between the stopping surface 412 and the side wall of the tailstock 31 at least exceeds the acute angle between the inclined guiding surface 411 and the side wall of the tailstock 31 by 20°. In this embodiment, the mentioned angle relative to the guide inclined plane 411 is 30°, and the mentioned angle relative to the stopping surface 412 is 75°. Therefore, after the inclining block 41 penetrates through the mounting hole 22, the stopping surface 412 can further tighten the damping head 32 to press the damping head 32 against the inner wall of the groove 21, playing the role of anti-detachment. If a detachment is desired, a force sufficient to elastically deform the stopping surface 412 and pull the tailstock 31 out of the hooking part 2 can be applied. After pulling out, the damping element 3 can be reinstalled and used.

In this embodiment, the inclining block 41, the elastic cushion block 33 and the tailstock 31 are integrally injection molded.

The implementation principle of Embodiment 1 is:

The tailstock 31 of the damping element 3 can be inserted into the mounting hole 22 of the hooking part 2, during which the damping element 3 is automatically pressed against the surface of the groove 21 of the hooking part 2. Then the base 1 will be mounted on a wall and ceiling. A rod component can be mounted in two or more the brackets, which is not easy to fall off since it will be limited by the damping head 32 after being clamped in the groove 21.

After the rod component is detached forcefully, if it is desired to replace a rod with different specifications, the damping element can also be pulled out and different damping elements can be mounted, for achieving the same damping effect.

Embodiment 2

Figure 4:
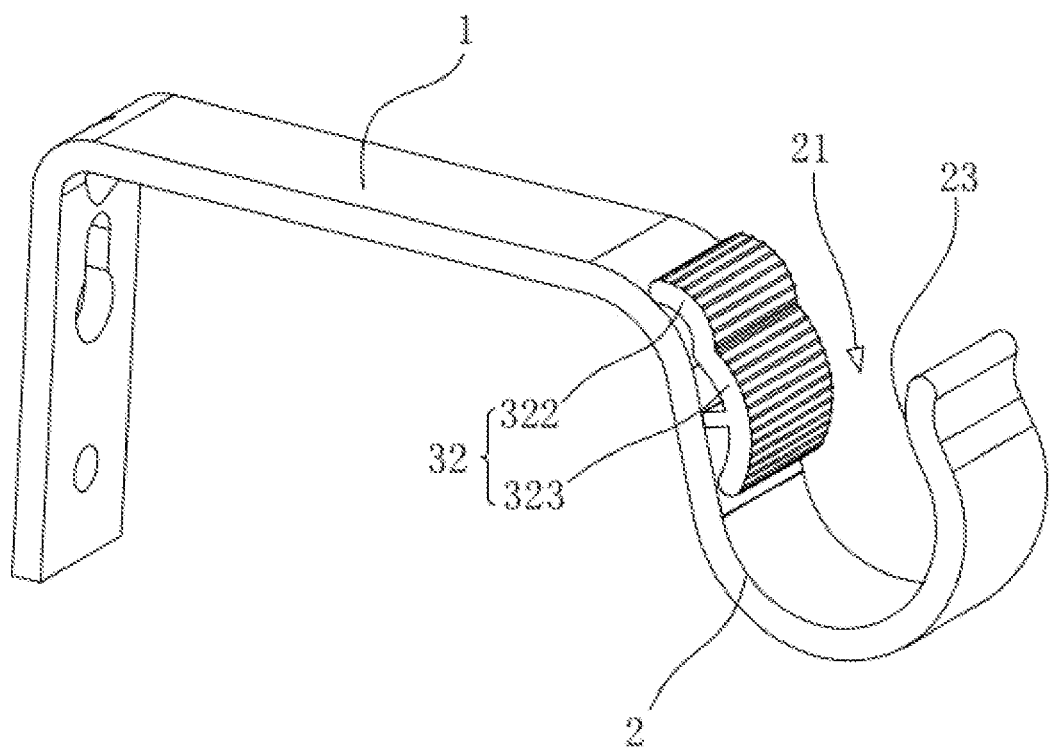
FIG. 4 is an overall structural diagram of a bracket of Embodiment 2.

Referring to FIG. 4, the difference between this embodiment and Embodiment 1 is that, the surfaces of the damping head 32 close to and away from the tailstock 31 are multi-segment arc surfaces, and all the arc surfaces of the damping head 32 bulge toward a side away from the tailstock 31. A connection portion between the groove wall of the groove 21 and the base 1 assumes an arc surface. An arc surface of the damping head 32 is divided into a primary arc portion 322 and a secondary arc portion 323. One end of the primary arc portion 322 abuts against the groove wall of the groove 21, and the end of the primary arc portion 322 connected with the secondary arc portion 323 abuts against the arc surface of the groove wall of the groove 21 connected with the base 1. All the ends of the secondary arc portion 323 abut against the arc surface connected between the groove wall of the groove 21 and the base body 1. A side wall of the groove 21 away from the base is provided with a convex portion 23, and the convex portion 23 faces a connecting portion between the multi-segment arc surfaces of the damping head 32.

In this way, when the rod component is pressed against the surface of the damping head 32, an end of the primary arc portion 322 connected with the secondary arc portion 323 will be displaced and deformed outward under the guidance of the arc transition portion between the groove wall of the groove 21 and the base 1, so as to provide better avoidance for installing the rod component. After the rod component is installed into the groove 21, if it is forced to fall off, the portion of the primary arc portion 322 towards the bottom of the groove will be pressed towards the opening of the groove 21, so that the middle portion of the primary arc portion 322 is pulled toward the groove 21 relative to the mounting hole 22, and the rod component will be easily stopped by the damping head 32. Hence, a simple-to-install and difficult-to-separate structure for a rod can be formed.

Embodiment 3

Figure 5:
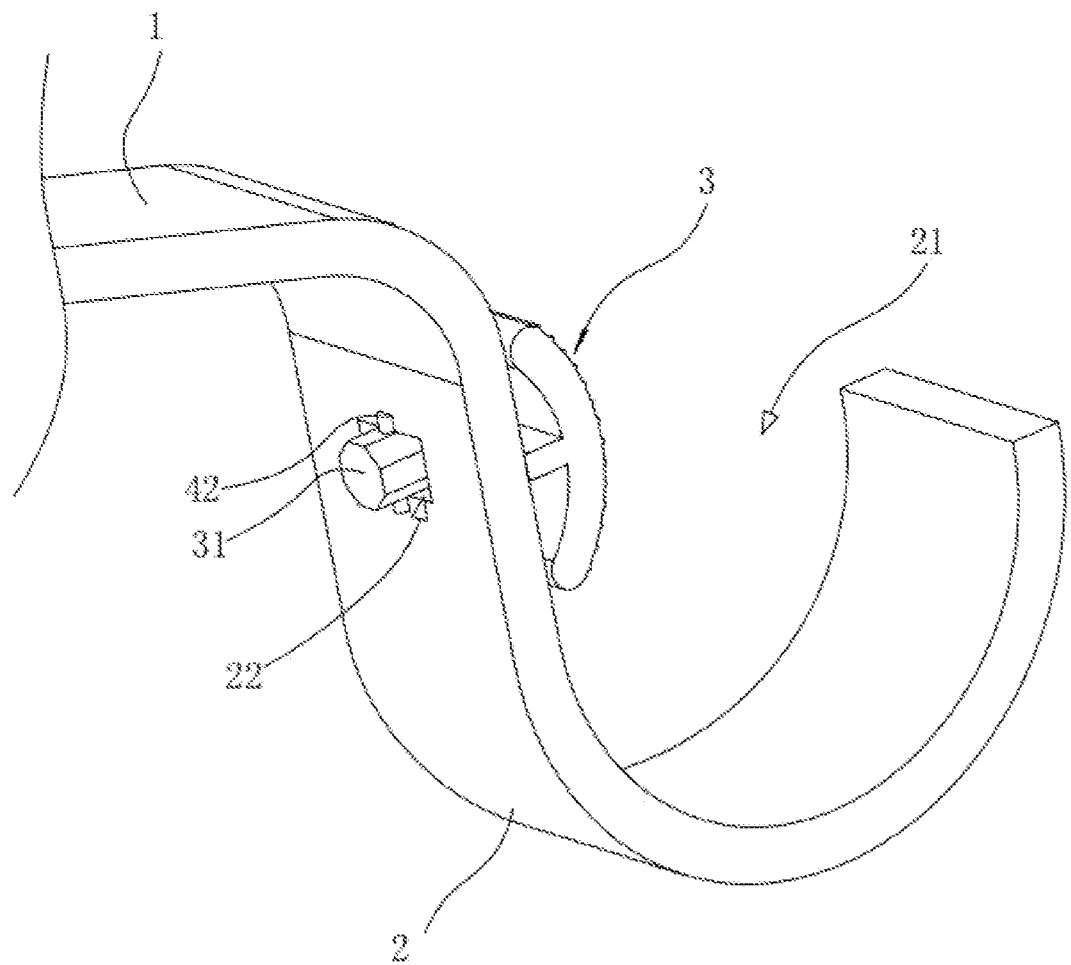
FIG. 5 is a structural diagram of a bracket of Embodiment 3.
Figure 6:
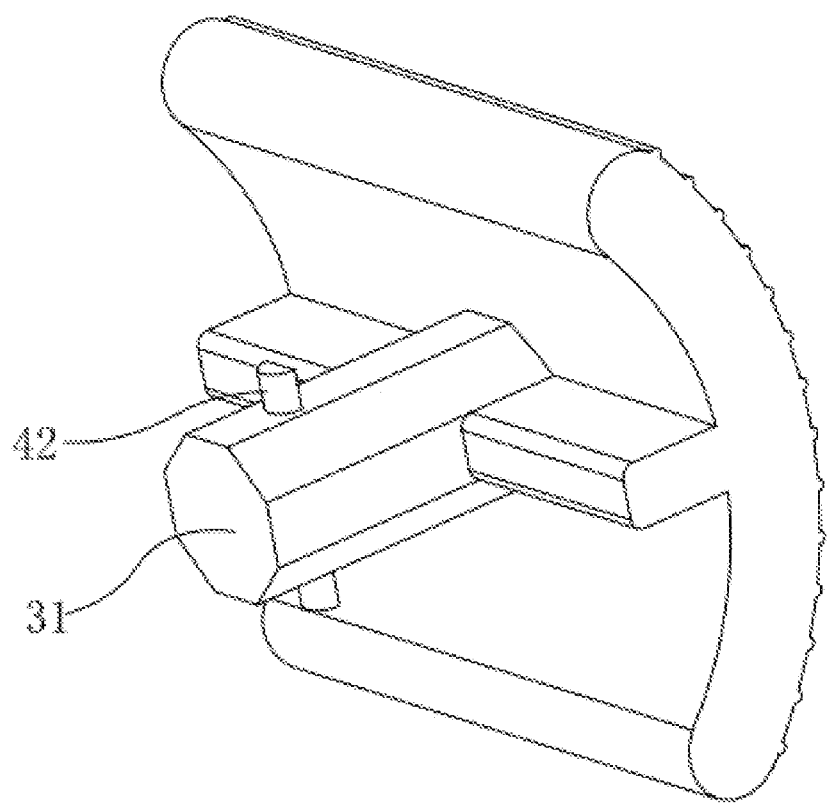
FIG. 6 is an overall structure diagram of a damping element of Embodiment 3.

Referring to FIG. 5 and FIG. 6, the difference between this embodiment and Embodiment 1 is that, the two opposite side walls of the tailstock 31 are respectively provided with a limiting column 42, the mounting hole 22 includes a main hole portion (not shown) for the tailstock 31 to pass through and a branch hole portion (not shown in the figure) for the limiting columns 42 to pass through, and the number of the secondary holes is equal to that of the limiting columns 42. The main hole portion and the branch hole portion can be holes with different cross-sectional shapes respectively. For example, the main hole portion is a square hole and the branch hole portion is a circular hole. Alternatively, they can jointly form a regular pattern. For example, a square hole can be divided into a main hole portion for the tailstock 31 to pass through and a branch hole portion for the limiting column 42 to pass through. In this embodiment, the mounting hole 22 is a rectangular hole as an example. A long side direction of the rectangle of the mounting hole 22 is in the same direction as the axis direction of the hooking part 2.

The tailstock 31 made of elastic material. the projection of the tailstock 31 along the long direction is of polygon, the polygon has an even number of sides. The number of sides of polygon is at least six. In this embodiment, the tailstock 31 is an octagonal prism as an example. In a final assembled state of the damping element 3 and the hooking part 2, the two opposite faces of the tailstock 31 are fitted with the two opposite and nearest hole walls of the mounting hole 22.

Taking an upward opening of the groove 21 as an example, when the length of the limiting column 42 is in a horizontal direction, a portion of the limiting column 42 abutting against a side surface of the hooking part 2 can be regarded as a straight line, and when the length of the limiting column 42 is in an upward direction, a portion of the limiting column 42 abutting against a side surface of the hooking part 2 can be regarded as a curve. Therefore, after the tailstock 31 and the limiting column 42 are inserted from the mounting hole 22, the rotation of the tailstock 31 changes the orientation of the limiting column 42 from a horizontal direction to a vertical direction. In this process, the tailstock 31 will also be further tightened so that the damping head 32 can closely fit with the inner wall of the groove 21. In addition, in the process of rotation, since the tailstock 31 is polygonal and the surface thereof fits with the hole wall of the mounting hole 22, the tailstock 31 is rotated mainly depending on the elastic deformation of the tailstock 31. After the rotation is completed, its shape can prevent reverse rotation.

Embodiment 4

Figure 7:
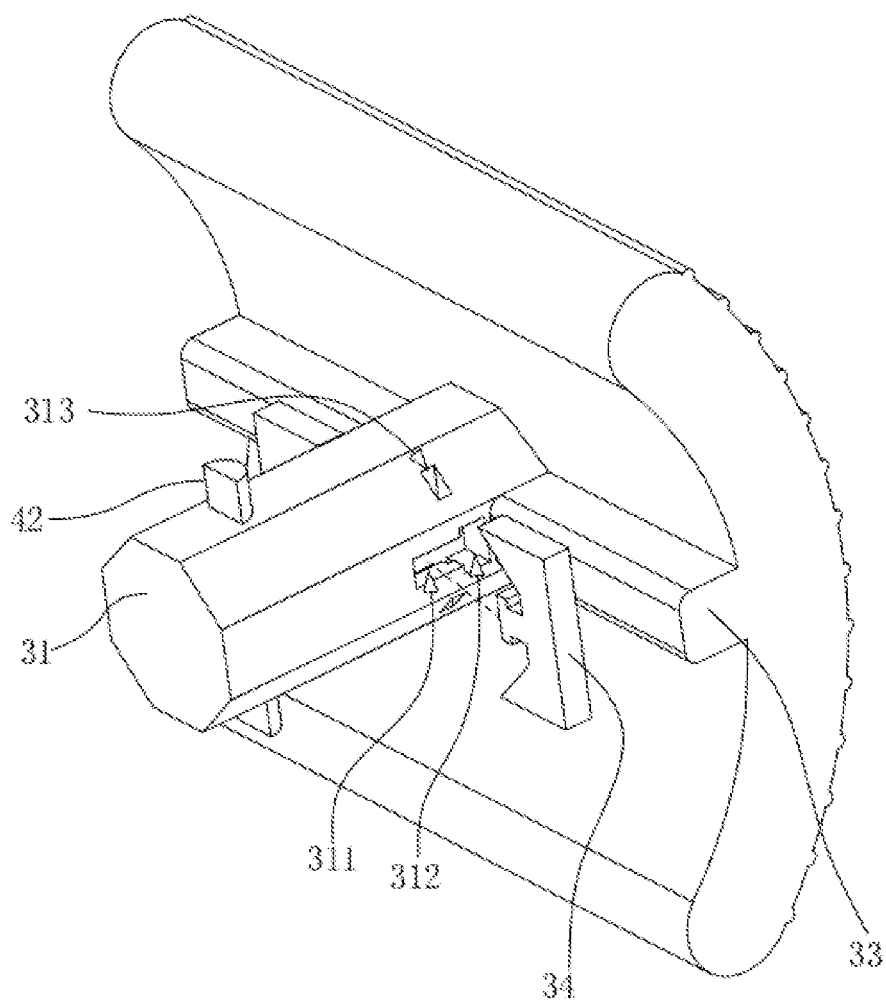
FIG. 7 is a structural diagram of detached damping element and filling block of Embodiment 4.

Referring to FIG. 7, the difference between this embodiment and Embodiment 3 is that, the tailstock 31 is provided with a sliding slot 311 on other opposite surfaces other than that provided with the limit column 42. The opening width of the sliding slot 311 on the surface of the tailstock 31 is less than the width of the inner cavity of the sliding slot 311. A side of the sliding slot 311 close to the damping element 3 is provided with an inlet slot 312, and the sliding slot 311 is slidably connected with a filling block 34 which can be used to fill the gap between the tailstock 31 and the mounting hole 22. A glue filling slot 313 laterally penetrating through the tailstock 31 along the tailstock 31 is recessed between the sliding slot 311 and the inlet slot 312.

After the tailstock 31 is rotatably installed in place, the filling block 34 can be inserted through the inlet slot 312, then move along the sliding slot 311 and fill the gap between the tailstock 31 and the mounting hole 22. Therefore, the tailstock 31 cannot rotate, and the tailstock 31 cannot move in the direction away from the mounting hole 22 due to the restriction of the limiting column 42. After the filling block 34 is installed, a solidifiable glue can be injected into the glue filling slot 313 from the side of the tailstock 31. After the solidifiable glue solidifies, since the glue filling slot 313 is laterally positioned on the sliding path of the sliding block, it can play a good limiting role with sufficient strength. When the damping element 3 is desired to be detached, a rod or needle smaller than the glue filling slot 313 or the glue filling slot 313 can be used to eject out the solidifiable glue.

In this embodiment, the elastic cushion block 33 can have a reduced thickness or directly omitted to provide convenience for providing the sliding slot 311. In other embodiments, the inlet slot 312 and the glue filling slot 313 can be provided at one end away from the damping head 32, so that the filling block 34 can be inserted into the sliding slot 311 from a side of the hooking part 2 (not shown) away from the groove 21 (not shown), and the thickness of the corresponding elastic cushion block 33 can remained unchanged.

Embodiment 5

Figure 8:
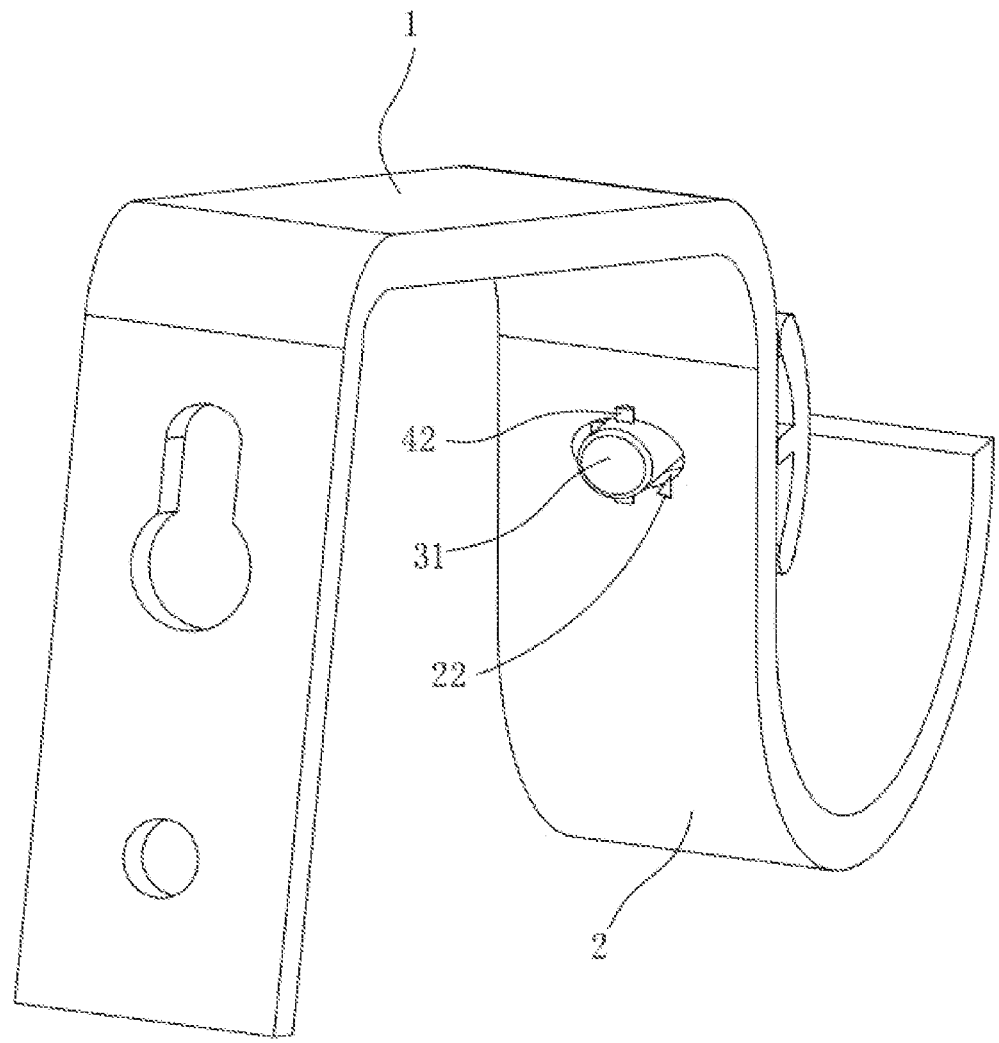
FIG. 8 is an overall structural diagram of a bracket of Embodiment 5.

Referring to FIG. 8, the difference between this embodiment and Embodiment 3 is that, the mounting hole 22 is an oval hole. The oval long axis of the mounting hole 22 is in the same direction as the axis of the hooking part 2. The tailstock 31 is an oval cylinder, the oval long axis of the tailstock 31 is shorter than the oval long axis of the mounting hole 22, the oval short axis of the tailstock 31 coincides with the oval short axis of the mounting hole 22, and the tailstock 31 is elastic. The long axis length of the tailstock 31 is sufficient to be reduced to be consistent with the short axis length of the mounting hole 22 within the elastic deformation range. The limiting column 42 is fixed in the area where the short shaft of the tailstock 31 is located.

In this embodiment, the oval short axis of the tailstock 31 coincides with the oval short axis of the mounting hole 22.

For installation, firstly, the oval short edge of the tailstock 31 is moved corresponding to the oval short edge of the mounting hole 22 until the limiting column 42 touches the inner wall of the groove 21. Then the tailstock 31 is rotated to elastically deform the tailstock 31, and the limiting column 42 falls into a position where it can pass through the mounting hole 22. Then, the limiting column 42 is inserted into the mounting hole 22 along with the tailstock 31 and passes through the mounting hole 22. In this state, the tailstock 31 has the elastic force of reverse rotation for restoring, and can be released or manually reversely rotated. In this way, the limiting column 42 will abut against a surface of the hooking part 2 far away from the damping head 32, playing the role of limiting and preventing detachment.

The above are the preferred embodiments of the present application, which are not intend to limit the protection scope of the present application. Therefore, all equivalent changes made according to the structure, shape and principle of the present application should be covered within the protection scope of the present application.

What is claimed is:

1. A bracket, comprising a base for external connection and a hooking part connected with the base, a bending portion of the hooking part forms a groove, a groove wall connected the groove with the base is provided with a mounting hole, the mounting hole is provided with a damping element, and a damping portion of the damping element is located in the groove.

2. The bracket according to claim 1, wherein the mounting hole penetrates through the surface of the hooking part, the damping element comprises a tailstock and a damping head fixedly connected with each other, the tailstock penetrates through the mounting hole, and the tailstock is provided with an anti-detachment structure to prevent the tailstock from falling off the mounting hole.

3. The bracket according to claim 2, wherein the anti-detachment structure comprises at least one elastic inclining block fixed at a side wall of the tailstock, the surface of the inclining block away from the damping head is an inclined guiding surface; and, when the tailstock is mounted in the mounting hole, the inclined guiding surface contacts the hole wall of mounting hole earlier than the other surfaces of the inclining block.

4. The bracket according to claim 3, wherein a surface of the inclining block near the damping head is a stopping surface, and an acute angle between the stopping surface and a side wall of the tailstock at least exceeds an acute angle between the inclined guiding surface and the side wall of the tailstock by at least 20°.

5. The bracket according to claim 2, wherein the surfaces of the damping head close to and away from the tailstock are arc surfaces, all of the arc surfaces of the damping head bulge to a side away from the tailstock, an elastic cushion block is fixed on one side of the damping head close to the tailstock and abuts against a groove wall of the groove, and at least one of two arc-shaped ends of the damping head abuts against the groove wall of the groove.

6. The bracket according to claim 2, wherein surfaces of the damping head close to and away from the tailstock are multi-segment arc surfaces, all of the arc surfaces of the damping head bulge to a side away from the tailstock; an arc surface of the damping head is divided into a primary arc portion and a secondary arc portion, a connection portion between the groove wall of the groove and the base assumes an arc surface; one end of the primary arc portion abuts against the side wall of the groove, and the end of the primary arc portion connected with the secondary arc portion abuts against the arc surface of the groove wall of the groove connected with the base; and all the ends of the secondary arc portion abut against the arc surface connected between the groove wall of the groove and the base body, a side wall of the groove away from the base body is provided with a convex portion, and the convex portion faces a connecting portion of the multi-segment arc surfaces of the damping head.

7. The bracket according to claim 2, wherein the two opposite side walls of the tailstock are respectively provided with a limiting column, the mounting hole comprises a main hole portion for the tailstock to pass through and a branch hole portion for the limiting column to pass through, and the number of the branch hole portions is same as that of the limiting columns.

8. The bracket according to claim 7, wherein the mounting hole is a rectangular hole, a long side of the rectangle of the mounting hole is in the same direction as that of an axis of the hooking part, a projection of the tailstock along the long direction is of polygon, the polygon has even number of sides, at least six sides, and the tailstock is made of elastic material; and when the tailstock is in s final assembled state of the damping element and the hooking part, the two opposite faces of the tailstock are fitted with the two opposite and nearest hole walls of the mounting hole.

9. The bracket according to claim 7, wherein the shape of the mounting hole is oval hole, an oval long axis of the mounting hole is in the same direction as that of an axis of the hooking part, the tailstock is an oval cylinder, an oval long axis of the tailstock is shorter than the oval long axis of the mounting hole, the tailstock is elastic, and the long axis length of the tailstock is sufficient to be reduced to be equal to a short axis length of the mounting hole within the elastic deformation range; and the limiting column is fixed in the area where the short axis of the tailstock is located.

10. The bracket according to claim 7, wherein the tailstock is provided with a sliding slot on at least one group of opposite surfaces other than that provided with the limit column, an opening width of the sliding slot on the surface of the tailstock is less than a width of an inner cavity of the sliding slot, a side of the sliding slot close to the damping element is provided with an inlet slot, the sliding slot is slidably connected with a filling block configured to fill a gap between the tailstock and the mounting hole, and a glue filling slot laterally penetrating through the tailstock along the tailstock is recessed between the sliding slot and the inlet slot.

\* \* \* \* \*